Nov. 5, 1935.　　　　N. MATTRO　　　　2,019,760
CABLEWAY CARRIAGE
Filed Feb. 14, 1933　　　2 Sheets-Sheet 1
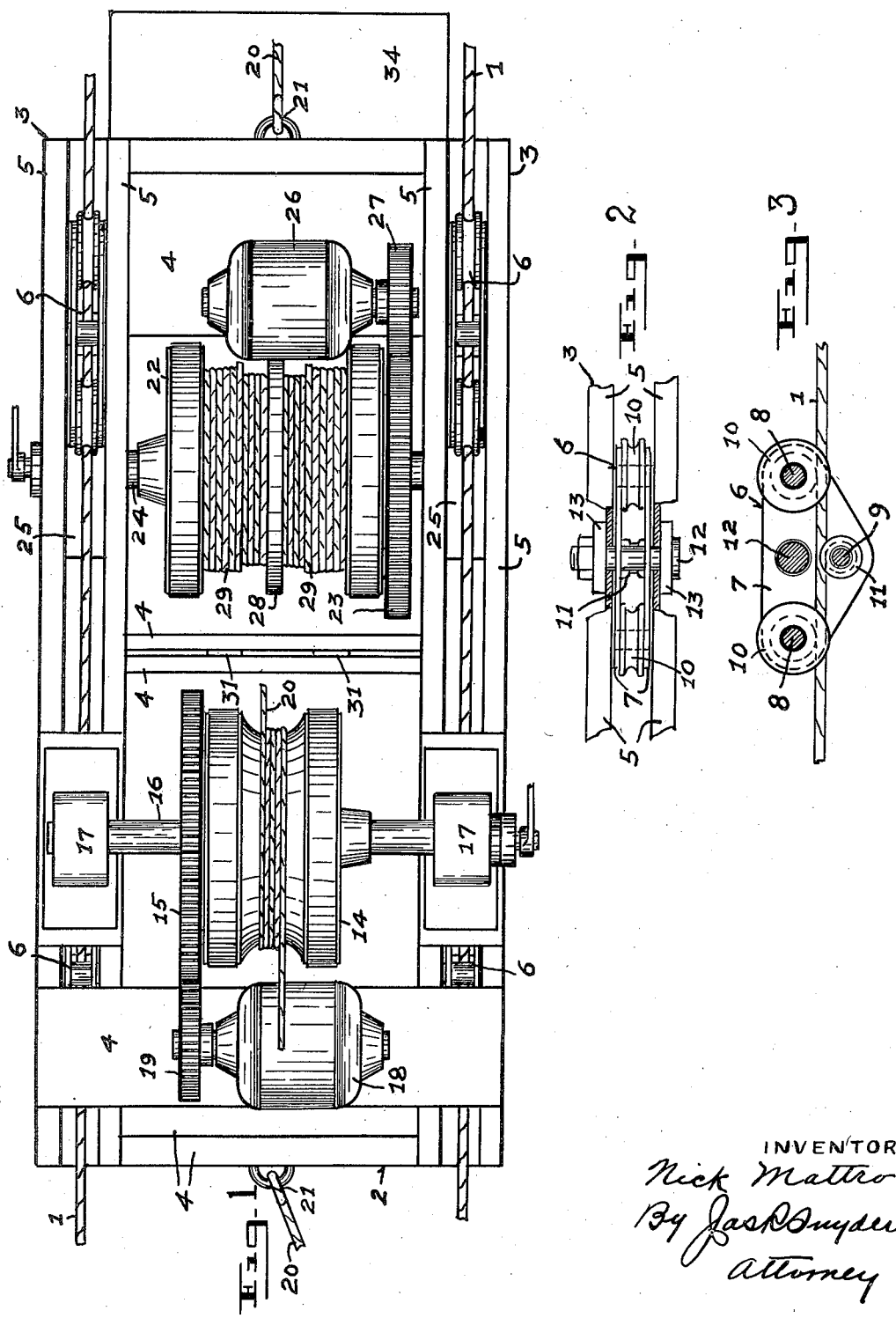
INVENTOR
Nick Mattro
By Jack Snyder
Attorney

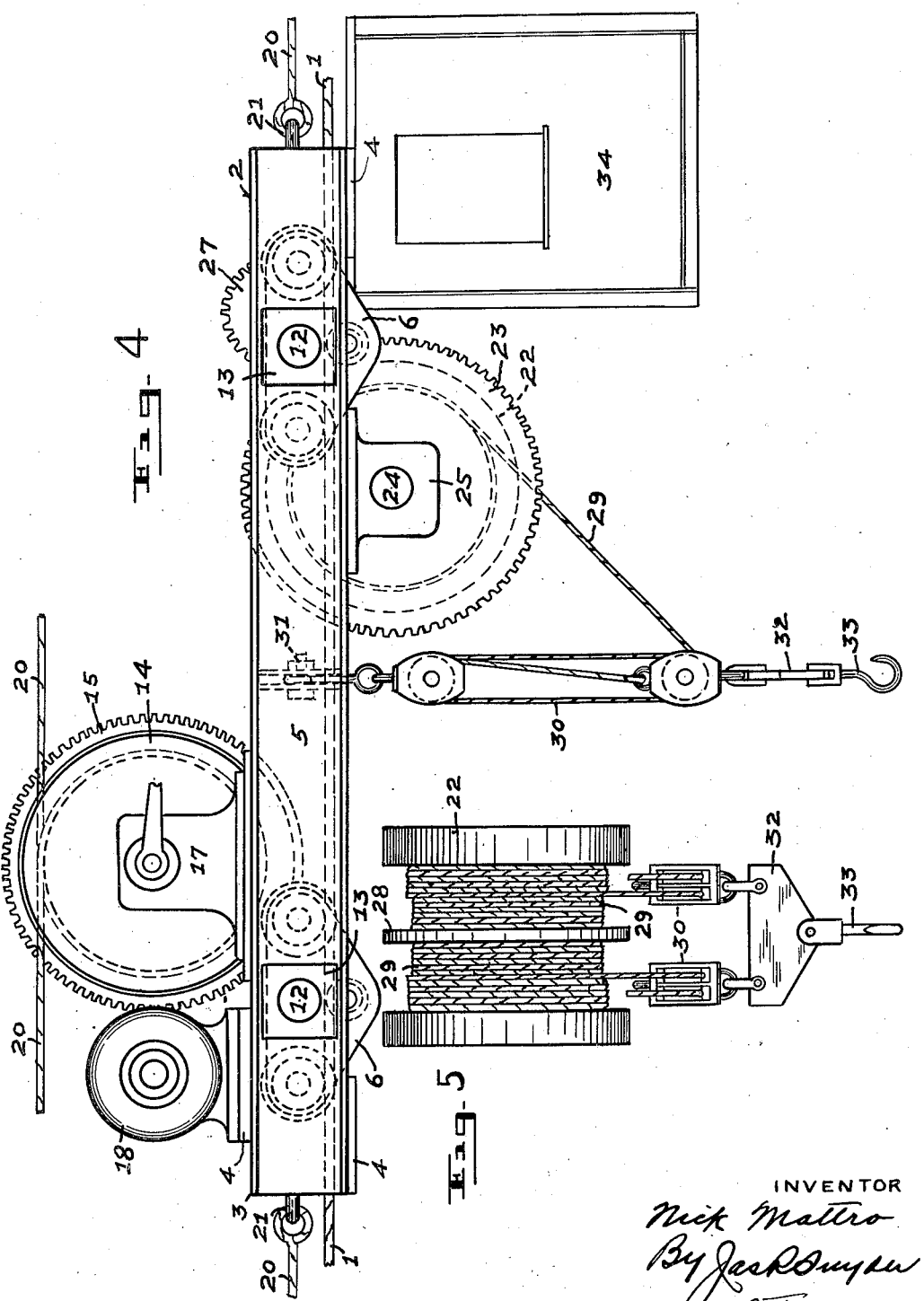

Patented Nov. 5, 1935

2,019,760

UNITED STATES PATENT OFFICE 2,019,760

CABLEWAY CARRIAGE

Nick Mattro, Pittsburgh, Pa., assignor of one-fourth to Francis B. Stablow and one-fourth to Thomas D. Stablow, both of Rochester, Pa.

Application February 14, 1933, Serial No. 656,704

1 Claim. (Cl. 105—148)

My invention relates to a cableway carriage, and important objects thereof are to provide a carriage of the character described, which is designed to travel and operate on a cableway track consisting of a pair of parallel disposed cables, which embodies novel means for imparting an accurately balanced pull thereto when lifting or carrying a load and which carries the operating and control mechanisms together with a cab for the operator employed.

Further objects of the invention are to provide a device of the class stated, which is simple in its construction and arrangement, durable and efficient in its use, compact, and comparatively inexpensive to manufacture, install and operate.

With the foregoing and other objects in view which will appear as the description proceeds, the invention resides in the construction, combination and arrangement of parts herein specifically described and illustrated in the accompanying drawings, but it is to be understood that the latter is merely illustrative of an embodiment of the invention, and that the actual needs of manufacture and practice may necessitate certain mechanical variations. It is therefore, not intended to limit the invention to the disclosure thereof herein illustrated, but rather to define such limitations in the claim hereunto appended.

In the drawings wherein like numerals of reference designate corresponding parts throughout the several views:—

Figure 1 is a top plan view of a cableway carriage constructed in accordance with the invention.

Figure 2 is a top plan view of a carriage truck illustrating its connection with the frame structure.

Figure 3 is a longitudinal sectional view of the carriage truck.

Figure 4 is a side elevational view of the cableway carriage.

Figure 5 is an end view of the elevating drum and of associated parts.

My improved cableway carriage is primarily intended for use in connection with temporary hoisting and conveying installations employed in quarrying operations, in the construction of bridges, dams, or any other operations necessitating the frequent hoisting and transportation of heavy loads of materials to and from locations not readily or conveniently accessible to hoisting and conveying apparatus traveling and operating on the ground.

Referring in detail to the drawings I denotes a pair of heavy cables, which form the aerial track cableway upon which my improved carriage is adapted to travel and operate. The pair of track cables I are disposed in uniform spaced relation and parallel to each other on horizontal planes. The ends of the track cables I extend from suitable towers to provide the required elevation for the cableway, and are fixedly anchored in any suitable manner well known in the art to which the invention appertains.

The carriage comprises a rectangularly-shaped frame 2, which consists of the longitudinally extending sides 3, and the transversely extending cross members 4. The sides 3 and cross members 4 are all fixedly secured together in position to provide a most rigid frame structure. Each of the sides 3 consists of a pair of parallel disposed side members 5, which are spaced from each other and preferably constructed from channel iron.

A pair of truck elements 6 is mounted between each associated pair of spaced side members 5 and positioned adjacent to respective ends of the latter.

Each of the track elements 6 comprises a pair of spaced triangularly-shaped truck plates 7, which are rigidly joined together by the pair of wheel axles 8 and by the roller axle 9. The axles 8 and 9 are rigidly, but preferably removably, secured to the pair of spaced truck plates 7, in any suitable manner.

The wheel axles 8 are longitudinally aligned with respect to each other and disposed at respective ends of the truck plates 7. The roller axle 9 is disposed below but centrally of the wheel axles 8 at the depending apex of the truck plates 7.

A grooved wheel 10 is revolubly mounted on each of the axles 8, and a grooved roller 11 is revolubly mounted on the axle 9. Each of the truck elements 6 is pivotally mounted in position by a heavy bolt 12, which extends transversely through the truck plates 7 and the side members 5. The latter are reenforced by fixed reenforcing plates 13, as clearly illustrated in Figure 2.

The grooved wheels 10, of each of the truck elements 6, engage the tops of the track cables I, while the grooved rollers 11 engage the under sides of the latter, as clearly shown in Figure 3. This arrangement positively prevents the disengagement of the truck elements 6 from the track cables I during the operation of the carriage.

A grooved travel drum 14, provided with a driving gear 15, is revolubly mounted on a transversely extending axle 16. The latter is fixed in a pair of supports 17 secured to the top of the frame sides 3. The travel drum 14 is driven by an electric motor 18, which is fixed in position on a cross member 4 of the carriage frame 2. The motor 18 is provided with a pinion 19, which meshes with the driving gear 15 of the travel drum 14.

The travel drum 14 is disposed in the longitudinal center of the frame 2 and operates the travel cable 20. The latter is coiled a plurality of times around the travel drum 14, extends in both directions over suitable sheaves and through weighted pulleys at respective towers at which the cableway is anchored, and returning to the carriage, has its terminals secured, as at 21, to respective ends of the frame 2.

The rotation of the travel drum 14, in connection with the travel cable 20, in the manner stated, will propel the carriage on the track cables 1 in either direction, the direction of travel of the carriage, of course, depending on the direction of rotation of the travel drum 14.

An elevating drum 22, provided with a driving gear 23, is revolubly mounted on a transversely extending axle 24. The latter is fixed in a pair of supports 25 secured to the bottom of the frame sides 3. The elevating drum 22 is driven by an electric motor 26, which is fixed in position on a cross member 4 of the frame 2. The motor 26 is provided with a pinion 27, which meshes with the driving gear 23 of the elevating drum 22.

The elevating drum 22 is divided, centrally of its length, by a division flange 28, which is disposed exactly in longitudinal center of the carriage frame 2.

Two separate elevating cables 29 are employed in connection with the elevating drum 22. The elevating cables 29 are uniform and coil and otherwise operate on the elevating drum 22 on respective sides of the interposed drum flange 28, as clearly illustrated in Figure 1.

Each of the elevating cables 29 is arranged in a pair of blocks in an assemblage to provide a tackle 30. Each of the latter has its upper end connected, as at 31, between a pair of cross members 4, of the frame 2. The tackle connections 31 are spaced equi-distant on respective sides of the longitudinal center of the frame 2, so that when my improved carriage is elevating or carrying a load, the latter will be perfectly balanced relatively to the carriage and with respect to track cables 1.

The lower end of the tackles 30 are pivotally joined to respective ends of a common cross-bar 32. The latter carries a centrally disposed connecting element in the form of a depending swivelled hook 33 adapted for connection with the load to be hoisted and conveyed.

The frame 2 carries a cab 34 adapted for accommodating the operator, and for housing the various control elements involved in the operation of my improved carriage.

The cable supplying electric current for the operation of the motors 18 and 26 preferably extend directly from tower to tower, and the current conducted therefrom by any suitable trolley appliance carried by the carriage. The current cable should be provided with weighted ends to normally hold same taut, while permitting corresponding sagging movement compensating for the sag of the track cables 1 when carrying the carriage with its load.

While illustrating and describing my improved carriage as operated by the electric motors 18 and 26, which are preferably of the variable speed and reversible type, it is evident that the device may be successfully operated by internal combustion engines instead, if electrical current supply is not available.

It will here be noted that my improved carriage may be provided with several elevating drums instead of the one elevating drum 22 as embodied in the disclosure herein illustrated and described. Such additional elevating drum would operate at a greater speed, with a faster or no tackle element, and would be utilized for dumping purposes, or for handling lighter loads.

The present invention provides a most efficient device of its kind, which will travel and operate on a cableway track, which embodies the operating mechanism, and which will facilitate the hoisting, conveying and placing of loads in the manner herein set forth.

What I claim is:

In an aerial cableway carriage of the character described, the combination of a pair of spaced parallel disposed frame members, a pair of parallel disposed truck plates mounted between said frame members, a pair of wheel axles fixed in respective ends of said pair of truck plates for rigidly securing the latter together, a wheel grooved to travel on a cable revolubly mounted on each of said pair of wheel axles, a reenforcing member secured against the side of each of said frame members, a transversely disposed pivoting element fixed in the latter and in said reenforcing members and extending through said pair of truck plates centrally intermediate of said pair of wheel axles for pivotally connecting said pair of truck plates between said pair of frame members, a roller axle fixed in said pair of truck plates below said pivoting element, and a roller grooved to travel on a cable revolubly mounted on said roller axle.

NICK MATTRO.